Patented July 22, 1941

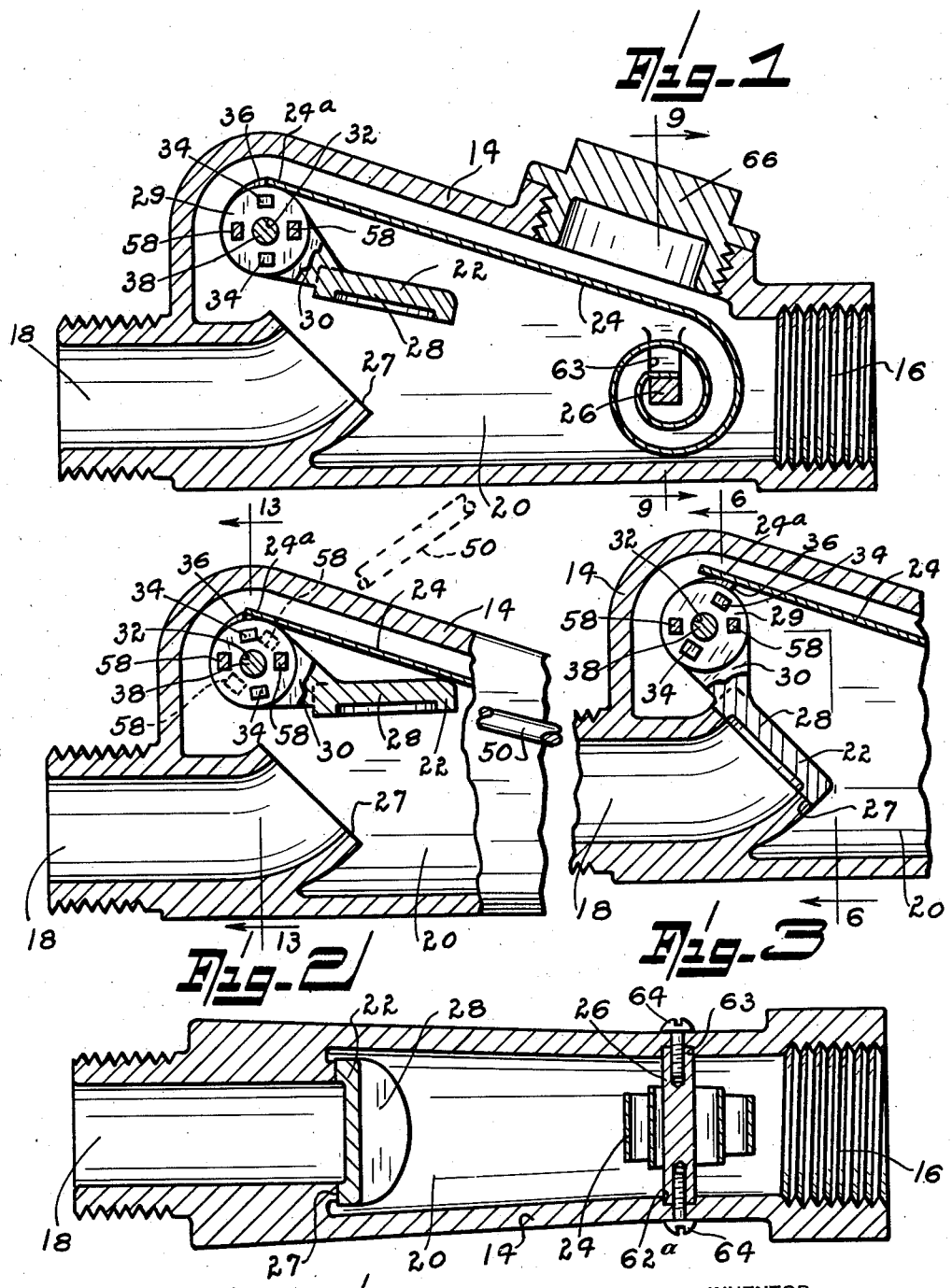

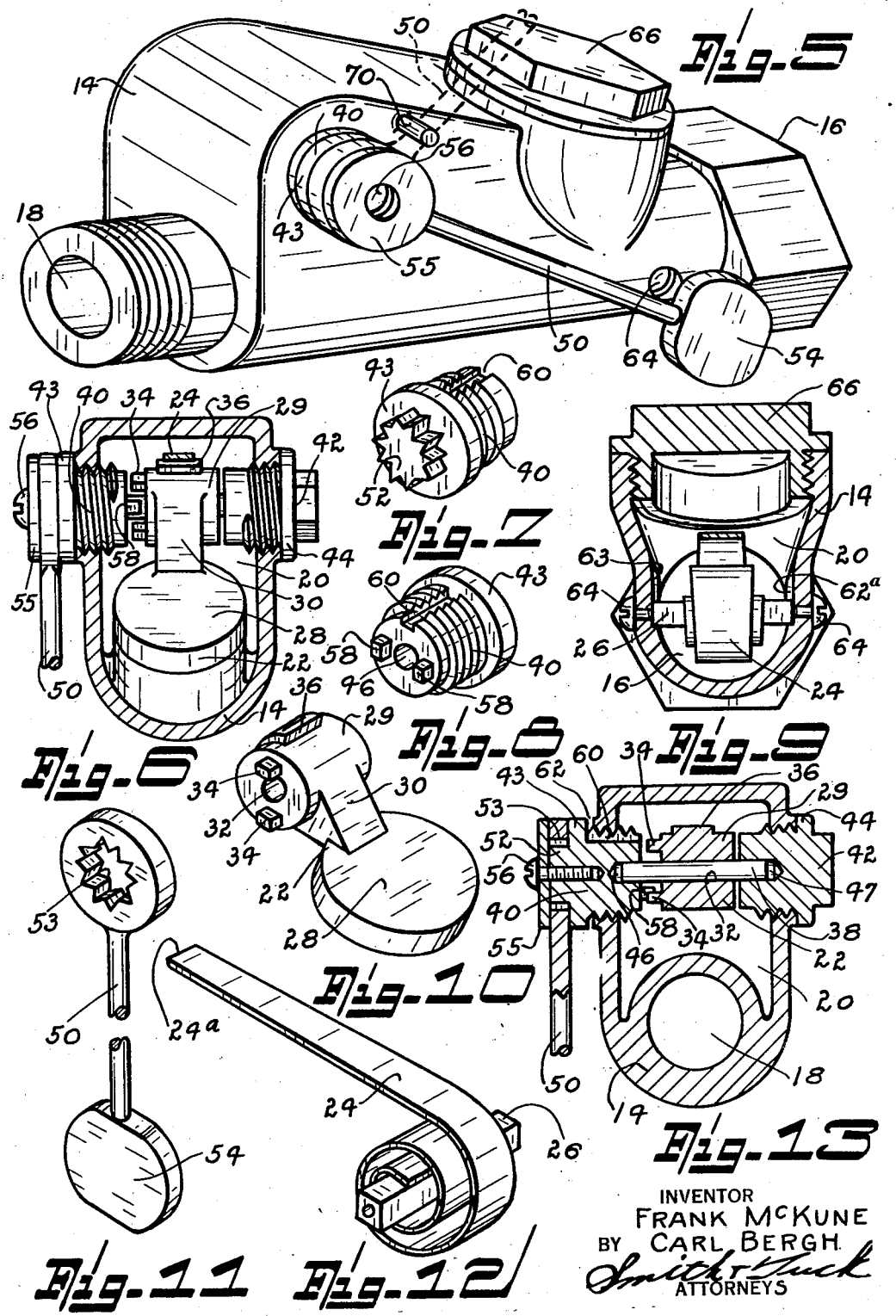

2,249,970

UNITED STATES PATENT OFFICE 2,249,970

THERMOSTATICALLY CONTROLLED SAFETY VALVE

Frank McKune, Seattle, and Carl Bergh, Stanwood, Wash.; said Bergh assignor to said McKune Application April 24, 1939, Serial No. 269,744

7 Claims. (Cl. 137—139)

Our present invention relates to the art of fluid valves and more particularly to a thermostatically controlled safety valve.

Our device consists essentially of a check valve, the valve member of which is retained in its open position, except when dangerously high temperatures are present in the fluid passing through the valve, at which time a thermostatic element is so disposed as to release the check valve member so that it can seat and stop the flow of liquid.

There are many uses for a valve arrangement that will prevent the passage through a pipe line of fluids after they have attained a certain temperature. There are many commercial installations where such a control is highly desirable, but particularly such a safety arrangement is desirable in conjunction with shower baths and the like so as to prevent a sudden change in water temperature from building up the temperature quickly to the point where dangerous burns or scalding may occur. There have been many cases of such scalding; each of which could easily have been prevented through the use of our safety device.

The principal object of our present invention is, therefore, to provide a check valve so arranged as to stop the flow of fluids when the temperature reaches an undesired high point.

Another important object of our present invention is to provide a check valve clapper which is held in its open position by a thermostatic element so disposed as to release the valve clapper and permit the same to close when a predetermined temperature has been reached in the fluid passing through the valve.

A further object of our present invention is to provide means whereby a thermostatically controlled check valve clapper may be reset after having been used to stop the flow of liquid without the necessity of opening the valve structure.

Still another object of our present invention is to provide a safety valve so arranged that its action is positive and cannot be caused to malfunction in any normal usage.

A still further object of our present invention is to provide a valve of such simple construction that it will be certain in operation and economical to manufacture.

Further objects of our invention are to provide a check valve having no necessary adjustment, that cannot be reset under abnormal conditions, which provides for venting the high pressure after the valve has been used so that it can be easily reset, and to further provide a construction that does not make use of sealing or packing glands that might interfere with the smooth operation of the device.

Other and more specific objects will be apparent from the following description taken in connection with the accompanying drawings, wherein Figure 1 is a cross-sectional view of our valve, with the check valve clapper member shown in the open position to allow fluid that has not reached an abnormal temperature to pass therethrough.

Figure 2 is a fragmentary section taken in the same sense as Figure 1, but showing the device in the position assumed when the thermostatic element has partly elongated to allow the check valve clapper member to free itself and close the outlet port.

Figure 3 is a view similar to Figure 2 being shown in fragmentary sectional elevation, showing the position of parts when the thermostatic element has further elongated under the action of heat, releasing the check valve clapper member.

Figure 4 is a horizontal, longitudinal, sectional view through our valve.

Figure 5 is a perspective view showing the outside of our valve.

Figure 6 is a sectional view taken along the line 6—6 of Figure 3.

Figure 7 is a perspective view showing the reset bearing of our device taken from the end normally exposed on the outside of the valve.

Figure 8 is a perspective view of the same part taken from the opposite end thereof.

Figure 9 is a cross-sectional view taken along the line 9—9 of Figure 1.

Figure 10 is a perspective view of the valve clapper member as used in our device.

Figure 11 is a perspective view showing the reset handle used with our devices, the same being shown as broken to foreshorten the bar of the same.

Figure 12 is a perspective view showing the thermostatic element and the bar upon which it is secured.

Figure 13 is a cross-sectional view taken along the line 13—13 of Figure 2.

Referring to the drawings, throughout which like reference characters indicate like parts, 14 designates generally the body or housing member forming the principal part of our valve. This member is provided with an inlet opening 16 and a discharge opening 18. These two members may be threaded as shown in Figure 1 or the male and female threads may be reversed; ordinarily with the male and female threads as indicated, easier installation can be effected. Enclosed within housing 14 is a chamber 20 this chamber forms the housing for the valve member or clapper 22 of the type common in clock valves and also the thermostatic element 24 and its supporting bar 26 and the valve seat 27.

Valve member 22 is provided with the valve disc portion 28, a hub portion 29, and a connecting web 30. Hub 29 is provided with an axial bore 32 and on one end is disposed, in a diametrically opposed relationship, resetting lugs 34. Also on hub 29 is provided an outstanding lug 36. This lug is adapted to engage the end of the thermostatic element 24 in a manner to be fully explained later. The clock valve or valve clapper 22 is supported by shaft 38 upon which it is free to revolve. Shaft 38 in turn is supported by the two bearing members 40 and 42, each of which are threaded into housing 14 and each are provided with suitable flanges as 43 and 44 so as to assure a leak-tight joint when the two abutting surfaces are properly machined. It will be noted, particularly from Figure 13, that shaft 38 is free to revolve within recesses 46 and 47 formed in bearing members 40 and 42 respectively, so that a free turning shaft is assured at all times without leakage. This is a matter of considerable importance for if the shaft were to pass through housing 14 it would be necessary to provide packing glands which would entail considerable friction and might seriously interfere with the satisfactory operation of the valve being acted upon normally in the beginning of its movement only by gravity. Bearing 42 is normally screwed firmly into place and is not subjected to any further movement; bearing 40, however, is mounted so that it may be partially revolved by means of handle 50 which is secured thereto by a fluted or splined joint so as to provide a wide range of angular adjustment. The male portion being preferably on plug 40 and indicated at 52, the female portion 53 being formed in handle 50. It has further been found desirable to provide reasonable weight in handle 50 consequently a weight or enlarged portion 54 is provided. The handle is normally set in secure engagement with member 40 by means of a washer 55 and securing screw 56 such as will be clear it is believed after a study of Figure 13. Bearing member 40 has other functions in addition to those described; it is provided with a plurality of diametrically disposed, reset lugs 58 which are adapted under certain conditions to engage reset lugs 34 of the valve clapper 22.

Bearing 40 is provided further with a groove at 60 which cuts through the threads below their roots so as to provide a channel as soon as the bearing plug 40 is unscrewed sufficiently to provide clearance as indicated at 62 in Figure 13. This passageway provides for a slight leakage when the bearing is unscrewed as occurs during the resetting operation and this relieves the pressure that will be trapped between valve clapper 22 and the shutoff valve for the outlet attachment as for instance a shower head.

The thermostatic element is probably best illustrated in Figures 1, 2, 3, and 12. It consists essentially of a ribbon 24 of suitable material, which is loosely coiled around its supporting bar 26 with its end fixedly secured thereto. Bar 26 in turn is adapted to fit into guideways or grooves as 62 and 63 formed within body 14 and to be held in that position by screws as 64. It will be noted that this element may be inserted in the guideways when the inspection cap 66 is removed from housing 14. The length of thermostatic ribbon 24 is such that its extreme end 24a will normally abut lug 36 after the showing of Figure 1, and in this manner will hold the valve clapper 22 in its raised, or open, position. When, however, undesired temperatures occur in the fluid passing through chamber 20, this ribbon expands so that it will overrun and revolve valve clapper 22 upwardly after the showing of Figure 2. When this condition is reached the cylindrical part of hub 29 will serve as a cam to raise the thermostatic element out of engagement with lug 36 and the normal tendency of ribbon 24 to uncurl will hold it off hub 29 so that the valve clapper 22 will be swung downwardly by gravity to the position shown in Figure 3, thus closing the flow of fluid through the valve and the continued pressure that will be applied through the intake end 16, will tend to hold the valve disc 28 still more firmly on its seat 27.

In order to prevent damage to the interior parts of our device, especially after it is installed, we provide a suitable stop as 70 so positioned as to limit the movement of lever 50 during the resetting operation. This assures that the small lugs 34 and 58 will not be sheared off by undue pressure applied to lever 50 for instance.

Method of operation

In using our device, it may be inserted between the shower head or point of delivery of the fluid used and the valve that controls the flow to that discharge or shower head so that the flow is from right to left as shown in the different views of our accompanying drawings. The thermostatic element 24 is so designed that when a predetermined temperature is reached the element will expand and raise the extreme end 24a of the thermostatic element out of engagement with lug 36 so that the valve assembly will fall under urgence of gravity at the beginning and then the draft through discharge 18, will carry it downwardly until disc 28 is firmly positioned upon seat 27. The flow of fluid through the valve will then be stopped until the valve is reset; this resetting, however, cannot be accomplished until the temperature has dropped below the critical temperature of the thermostatic element, as until that occurs the extreme end 24a will be beyond the point where it can fall in behind lug 36. As soon, however, as the temperature has dropped and the thermostatic element is in its normal position again it will bear downwardly on hub 29 and then if handle 50 is raised setting will be accomplished. The first action, as the handle is raised, is to partially unscrew bearing member 40 which permits a small amount of the water trapped within chamber 20 to pass out through groove 60 and clearance space 62a so as to take any static pressure off disc 28 of valve 22. A continued upward movement of handle 50 causes reset lugs 58 to engage reset lugs 34 of the valve clapper 22 and when these lugs are engaged the continued rotation of handle 50 upwardly, or to the dotted line position shown in Figures 2 and 5, will carry with it the valve clapper 22 until it is raised substantially to the position shown in Figure 1, at which time end 24a of the thermostatic element will again be seated behind lug 36; and handle 50 should then be allowed to fall to its normal lower position as shown in full line in Figure 5 and the weight of the valve will be held by the thermostatic element in such a position that an increase in temperature above the normal desired will again effect the closing of the valve in the manner previously stated.

The foregoing description and the accompanying drawings are believed to clearly disclose a preferred embodiment of our invention but it will be understood that this disclosure is merely illustrative and that such changes in the invention may be made as are fairly within the scope and spirit of the following claims.

Having thus fully described our invention, what we claim as new and desire to secure by Letters Patent is:

1. The combination with a housing having inlet and outlet ports for fluid under pressure, of a valve clapper for the outlet port having a hub pivotally supported in the housing above the outlet port, an element of thermostatically actuated material in said housing spaced from the valve and having an expansible extension with its free end resting on said hub, and a lug on the hub forming an abutment for the free end of the extension, and means on said hub for dislodging said extension from abutment with the lug when the element and its extension are expanded by contact with fluid of a pre-determined temperature.

2. The combination with a housing having inlet and outlet ports for fluid under pressure, of a valve clapper having a hub and a pivot pin journaled in said housing, said hub having an abutment lug on its periphery, a thermostatic coil supported in the housing and spaced from the valve clapper hub, and said coil having an expansible extension with its free end resting on the hub and engaging the lug, whereby the extension is automatically disengaged from the lug when a predetermined temperature is attained in the fluid.

3. The combination with a housing having inlet and outlet ports for fluid under pressure, alined bearing plugs mounted in opposite walls of the housing, one of said plugs being partially rotatable in the housing wall, and a clutch member on the partially rotatable plug, of a hub having a pivot pin journaled in the plugs above the outlet port and a valve clapper rigid with the hub for closing the outlet port, said hub also having a clutch member for co-action with the first clutch member in re-setting the valve, a weighted arm for partially rotating the clutch-plug, and a thermal controlled device in the housing for holding the valve clapper in open position.

4. A thermostatically operated valve comprising a housing having inlet and outlet ports, a revolvable bearing member in said housing and having a vent port communicable to the interior of said housing and normally closed to the atmosphere exterior of said housing, a valve clapper having a pivot hub including reset lugs on a face of said pivot hub, said valve clapper being swingingly journaled in said revolvable bearing member and said housing adjacent the outlet port thereof, abutment means on said valve clapper, a coil of thermostatically actuated material mounted in said housing and having an expansible extension cooperable with said abutment means to normally hold said clapper in the open position, said coil being actuated to release said clapper and close said outlet port when fluid of a predetermined temperature contacts said coil and its extension, reset lugs on said revolvable bearing member cooperable with the reset lugs on the clapper hub, means for revolving said revolvable bearing member to reset the valve clapper in the open position, and to simultaneously open said vent port to exterior atmosphere, and means operable on said revolvable bearing member to maintain the vent port in said member closed during the normal operation of the valve.

5. A thermostatically operated valve comprising a housing having inlet and outlet ports, a revolvable bearing member in said housing and having a vent port communicable to the interior of said housing and normally closed to the atmosphere exterior of said housing, a valve clapper having a pivot hub including reset lugs on a face of said pivot hub, said valve clapper being swingingly journaled in said revolvable bearing member and said housing adjacent the outlet port thereof, abutment means on said valve clapper, a coil of thermostatically actuated material mounted in said housing and having an expansible extension cooperable with said abutment means to normally hold said clapper in the open position, said coil being actuated to release said clapper and close said outlet port when fluid of a predetermined temperature contacts said coil and its extension, reset lugs on said revolvable bearing member cooperable with the reset lugs on the clapper hub, and means for revolving said revolvable bearing member to reset the valve clapper in the open position, and to simultaneously open said vent port to exterior atmosphere.

6. A thermostatically operated valve comprising a housing having inlet and outlet ports, a revolvable bearing member in said housing, a valve clapper having a pivot hub including reset lugs on a face of said pivot hub, said valve clapper being swingingly journaled in said revolvable bearing member and said housing adjacent the outlet port thereof, abutment means on said valve clapper, a coil of thermostatically actuated material mounted in said housing and having an expansible extension cooperable with said abutment means to normally hold said clapper in the open position, said coil being actuated to release said clapper and close said outlet port when fluid of a predetermined temperature contacts said coil and its extension, reset lugs on said revolvable bearing member cooperable with the reset lugs on the clapper hub, and means for revolving said revolvable bearing member to reset the valve clapper in the open position.

7. A thermostatically operated valve comprising a housing having inlet and outlet ports, a revolvable bearing member in said housing, a valve clapper having a pivot hub including reset lugs on a face of said pivot hub, said valve clapper being swingingly journaled in said revolvable bearing member and said housing adjacent the outlet port thereof, abutment means on said valve clapper, a member of thermostatically actuated material mounted in said housing and having an expansible extension cooperable with said abutment means to normally hold said clapper in the open position, said member being actuated to release said clapper and close said outlet port when fluid of a predetermined temperature contacts said member and its extension, reset lugs on said revolvable bearing member cooperable with the reset lugs on the clapper hub, and means for revolving said revolvable bearing member to reset the valve clapper in the open position.

FRANK McKUNE.
CARL BERGH.